United States Patent
Frei

(10) Patent No.: US 6,685,791 B1
(45) Date of Patent: Feb. 3, 2004

(54) METHOD FOR THE PRODUCTION OF AN AIR BAG HAVING A THREE-DIMENSIONAL FORM

(75) Inventor: German Frei, Erdweg (DE)

(73) Assignee: Autoliv Development AB (SE)

( * ) Notice: Subject to any disclaimer, the term of this patent is extended or adjusted under 35 U.S.C. 154(b) by 0 days.

(21) Appl. No.: 09/936,797

(22) PCT Filed: Mar. 10, 2000

(86) PCT No.: PCT/EP00/02097

§ 371 (c)(1), (2), (4) Date: Jan. 16, 2002

(87) PCT Pub. No.: WO00/53460

PCT Pub. Date: Sep. 14, 2000

(30) Foreign Application Priority Data

Mar. 11, 1999 (DE) .......................................... 199 10 823

(51) Int. Cl.[7] .................... B32B 31/18; B29C 65/00; B60R 21/16; B65D 50/10; B31B 49/04
(52) U.S. Cl. ................... 156/250; 156/256; 156/258; 156/269; 156/304.1; 156/217; 280/728.1; 280/743.1; 383/3; 493/186; 493/227; 493/231
(58) Field of Search .................... 156/250, 256, 156/258, 266, 269, 304.1, 304.2, 217; 280/728.1, 743.1; 383/3; 493/186, 227, 231, 243, 244, 940

(56) References Cited

U.S. PATENT DOCUMENTS 4,944,529 A * 7/1990 Backhaus ................ 280/743.1
5,316,337 A * 5/1994 Yamaji et al. ........... 280/743.1
5,931,498 A * 8/1999 Keshavaraj .............. 280/743.1
6,439,606 B2 * 8/2002 Okada et al. ............ 280/743.1

FOREIGN PATENT DOCUMENTS

| DE | 2224827 |   | 11/1972 |          |
|----|---------|---|---------|----------|
| DE | 2224827 | * | 11/1973 | .......... B60R/21/10 |
| DE | 4226954 A1 |   | 2/1994  |          |
| DE | 4324487 | * | 1/1995  | .......... B60R/21/16 |
| DE | 4324487 A1 |   | 1/1995  |          |
| EP | 687596 | * | 12/1995 | .......... B60R/21/16 |
| EP | 0687 596 B1 |   | 12/1998 |          |
| GB | 2 304 738 A |   | 3/1997 |          |
| JP | 02-220943 | * | 9/1990  | .......... B60R/21/16 |
| JP | 08-268195 | * | 10/1996 | .......... B60R/21/16 |
| JP | 09-254730 | * | 9/1997  | .......... B60R/21/16 |
| JP | 10-35380 | * | 2/1998  | .......... B60R/21/16 |

* cited by examiner

Primary Examiner—J. A. Lorengo
(74) Attorney, Agent, or Firm—R W Becker & Associates; R W Becker

(57) ABSTRACT

A method for producing for deployment in an air bag module an air bag which in its inflated condition has a three-dimensional form via the fabrication of a two layered material web from which individual air bag cut-outs are continuously cut includes connecting the material web layers to one another along closed contours such that the edges so formed from the connection of the material web layers to one another exhibit a trapezoidal-like shape. The method also includes cutting along a cutting line such that the path of the cutting line of the individual air bag cut-out to be cut out does not correspond, in the area of the corners of the longer trapezoid side, to the contour edge but, instead, to contribute to the formation of the height of the three-dimensional air bag, extends inwardly.

13 Claims, 3 Drawing Sheets

METHOD FOR THE PRODUCTION OF AN AIR BAG HAVING A THREE-DIMENSIONAL FORM

BACKGROUND OF THE INVENTION

The present invention relates to a method for producing for an airbag module an airbag which, in its inflated condition, has a three-dimensional form, via the fabrication of a two-ply or two-layer material web out of which individual airbag cut-outs are continuously cut, whereby the material web layers are connected with one another along closed contours and whereby, through the connection of the material web layers through their contour edges, a trapezoid-like form is configured.

A method having the afore-described features is disclosed in DE-OS 22 24 827, according to which the cutout for the individual airbag has a trapezoid form and the individual cutouts are arranged continuously in a two-layer material web. The individual cut-outs are thereby formed by the bringing together of the two material layers with one another by corresponding stitching, whereby the cutting or separation of the individual cutouts from one another is accomplished by the cutting of the material webs connected to one another between the individual stitches. To the extent that the configuration of a three-dimensional airbag initially involves pulling the two material web layers away from one another in the area of a corner in opposed directions perpendicular to the cutting plane, there occurs in the region of the respective corner a down hanging apex; this apex is first stitched off by an additional thread and is thereafter cut out. The oppositely disposed corners of the trapezoid sides of the cutout are handled in the same manner.

In this regard, the conventional methods bring with them the disadvantage that the production of a three-dimensional airbag from an individual cut-out which has been already cut out of the material web requires several folding and stitching steps, as well as the execution of additional cuts on the cut-out, so that, consequently, the production process is relatively cost burdensome.

The present invention offers a solution to the challenge of providing a method which is improved such that the individual finishing steps including additional foldings or, respectively, darts and cutting, are avoided.

SUMMARY OF THE INVENTION

The solution of the present invention is characterized by the following advantageous configurations and further details as recited in the contents of the dependent claims which follow the hereinafter following description.

The present invention provides, as its core concept, that the cutting path along which the airbag cut-outs are to be cut out of the material web are not, in the area of the corners of the relatively longer parallel side of each trapezoid, paths designed to correspond to the contour edges but instead are paths which, to contribute to formation of the height of the three-dimensional airbag, extend inwardly in a triangular shape, whereby, to eventually accomplish the completion of a closed airbag, the cutting edges which are thus on each material web are connected with one another. The present invention brings with it the advantage that the material web is simple to produce in a continuous production manner out of two flat material web layers which lie on one another and which is also easily handled via an automatic production process. Since the production of the individual cut-outs through the cutting, in accordance with the present invention, of the branches by itself already prevents the creation of surplus folding corners, the configuration of the three-dimensional airbag from each individual cut-out is simplified.

The method of the present invention is suitable not only for material webs formed of typical woven webs but also for a gas impermeable or, respectively, semi-permeable sheets which are formed together into airbags.

In accordance with one embodiment of the present invention, it is provided that the individual cut-outs are cut or separated from the material web along cutting lines extending parallel to the border edges, and whereby a shortened inwardly directed branch is formed in each one of those respective corner areas defined by the intersection of the border edges with one another-specifically, those corner areas oppositely disposed to one another each defined by the respective intersection of one of the two respective border non-parallel edges with the border edge of the longer parallel trapezoid side-with each branch having two respective edges lying outside of the stitched together area of the individual cut out, and whereby the remainder of the longer parallel border edge extending between the two respective branches of each trapezoid is folded inwardly upon lifting of the two material web layers away from one another and the edges of each individual branch, which are now oppositely disposed to one another due to the lifting of the material web layers away from one another, are connected to one another.

To this extent, it can be provided that each individual airbag cut-out has the form of an equilateral trapezoid and the respective two branches of the individual airbag cut-out are disposed in the corner areas of the respective longer one of the two parallel border edges of the trapezoid, each of the two edges of each branch being perpendicular or, respectively, parallel, to the parallel border edges of the equilateral trapezoid, whereby there is produced, in an advantageous manner in connection with a right-angled base surface, a wedge-shaped configuration of the finished airbag, whereby the shorter of the two parallel border edges of the trapezoid-shaped cut-out form the upper parting lines of the wedge. In this manner, the edges of the two branches can have either a straight extent or a curved extent.

In accordance with one embodiment of the present invention, it is provided that the individual cut-outs are so configured in the length direction of the material web that the parallel border edges of each trapezoid-shaped cut-out lie parallel to those of the other trapezoid-shaped cut-outs, and there is thus obtained, in this connection, the advantage of a good exploitation of the material web for the arrangement of the cut-outs thereon.

In order to further reduce the production effort, the method of the present invention, in accordance with one embodiment thereof, can be configured such that the longer parallel border edges of one cut-out forms, with the shorter parallel border edge of an adjacent or neighboring cut-out, a common seam and the separation of the cut-outs from one another is undertaken along a cutting line extending within the seam.

In accordance with one embodiment of the present invention, it is provided that the connection of the material layers to thereby form the contour edges is accomplished by a unitary or integral webbing of the web layers of a web to thus form an intermediate work product. As disclosed in DE 42 26 954 A1 as well as DE 43 24 487 A1, a similar process for producing an airbag is known in which the border edges of the individual cut-outs are configured by the unitary webbing together of the two web layers; the individual cut-outs are arranged at spacings from one another on the continuously webbed material web and are respectively separated or cut away from one another out of the material web, so that a corresponding cut-out material loss is involved in the process.

In view of the production of the branches on the longer parallel border edges with their respective branch edges, it can be provided, in an alternate embodiment of the present invention, that all border edges of the trapezoid-shaped cut-outs are webbed or woven together in a unitary manner by a seam and the branches disposed in the corner areas, in connection with the cutting out of the individual cut-outs from the material web, are cut away from the web by cutting along cutting lines which lie on the edges of the branches, or that the border edges of the trapezoid-shaped cut-outs are unitarily woven together by a seam which bypasses the edges of the two branches.

In accordance with an embodiment of the present invention, as an alternative to the unitary webbing of the material web layers, it is provided that the connection of the material web layers to thereby form the contour edges is accomplished via adhesion, welding, or sewing of the two material web layers together. As an intermediate or work in process product, a two-layered web or a gas impermeable or, respectively, semi-permeable sheet, can serve as the material web.

BRIEF DESCRIPTION OF THE DRAWINGS

In the drawings, an embodiment of the present invention is further illustrated. The drawings show.

DESCRIPTION OF PREFERRED EMBODIMENT

The present invention is hereinafter described in connection with an intermediate or work in process product, which is comprised of a two-layer material web 10 having web layers 21, 22, described in more detail hereinafter, which are unitarily interwoven with one another. The deployment of the method of the present invention is thus not limited to the described embodiment, but, rather, encompasses as well, for example, sheets of suitable configuration as the intermediate work product material for the production of an airbag as well as any alternative connection structure for interconnecting the material web layers to one another via adhesion, sewing, or welding.

Figure 1A:
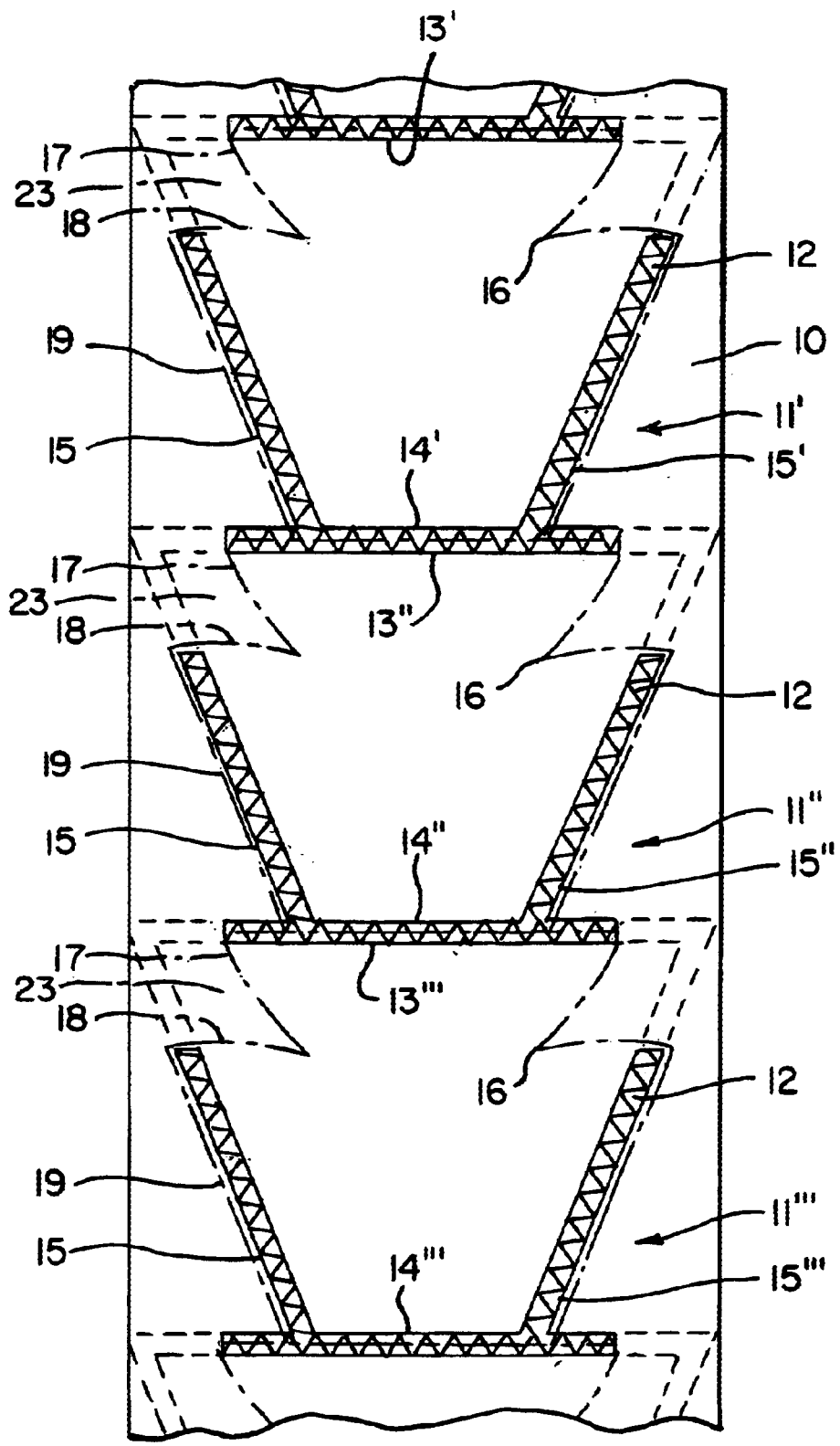
FIG. 1a is a perspective view of a material web with several cutouts arranged thereon, each for a respective airbag.
Figure 1B:
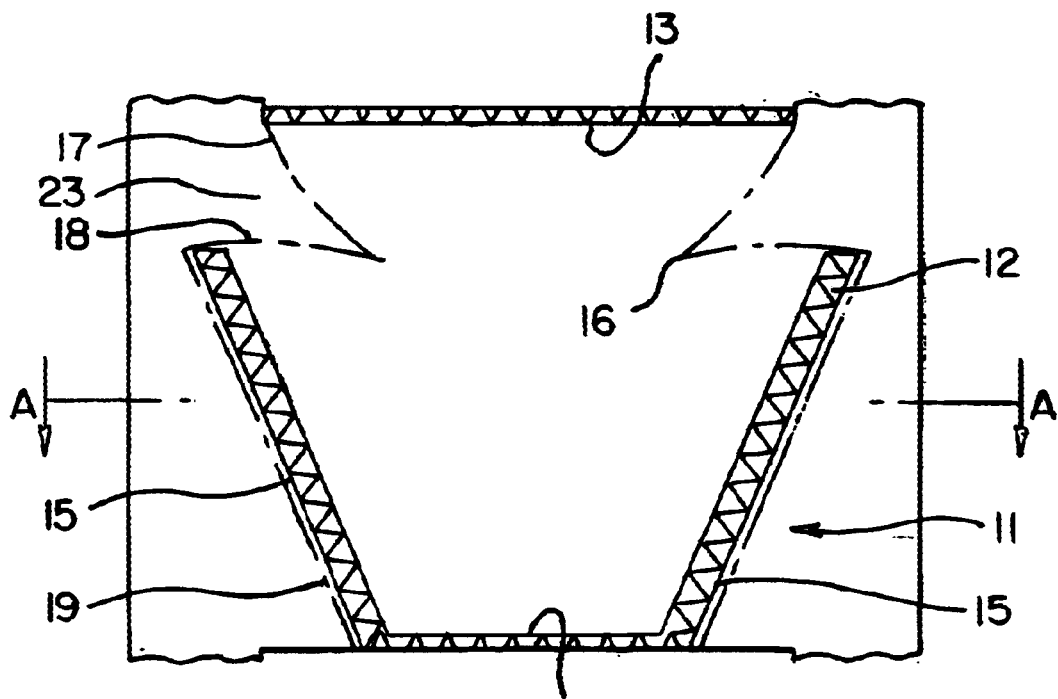
FIG. 1b is a view of an individual cut-out for an airbag which has been cut out of the material web shown in FIG. 1a, FIG. 2 is a view of a section taken along line A—A in FIG. 1b.
Figure 2:
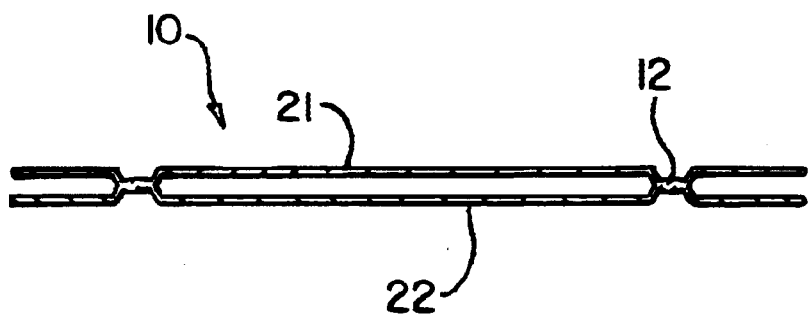
Figure 3:
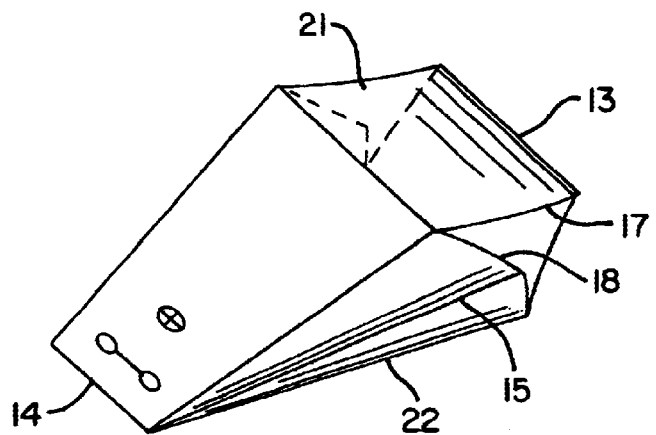
FIG. 3 is a view of an individual cutout with the web layers lifted away from one another before the connection of the branch edges to one another.

As can be seen in FIGS. 1a, 1b, and 2, individual cut-outs 11 each to be subsequently finished into an airbag and arranged serially in the length direction of the material web 10, are cut out of the material web which is comprised of two flat material web layers 21, 22 disposed one on top of the other. The individual cutouts 11 each have the basic form of an equilateral trapezoid with a relatively longer parallel border edge 13 as well as a relatively shorter parallel border edge 14 and non-parallel border edges 15 extending between the parallel border edges. As can be seen in the collective illustrations of FIGS. 1a, 1b, and 2, the border edges 13, 14, 15 are woven together along their extents through a unitary webbing in the form of an interconnecting seam 12 which interconnects the two material layers 21, 22 to thereby form a woven contour edge, so that in those areas of the border edges no particular or special connection of the material web layers to one another is further required. This leads to the result that, in the series of cut-outs 11 illustrated in FIG. 1, the longer parallel border edge 13 of each respective lower, next following cut-out and the upper, shorter parallel border edge 14 of the respective cut-out disposed thereabove together form a common seam 12, whereby the reference numeral 14 indicates only that portion of the border edge lying between the border edges 15.

To the extent that FIG. 1a shows a series of three cut-outs 11', 11", 11''', the cut-out 11' is arranged with the border edges 13', 14' and 15'; the same corresponding arrangement exists as well for the cut-out 11" and the cut-out 11'''. In this manner, a common seam 12 along the border edges 14' of the border edges 13" of the cutout 11" forms a woven contour edge.

In the corner regions on both sides of the longer parallel extending border edges 13, which border edges are produced with the unitary webbing deployed there through, the connections of the border edges 13 with the respective border edges 15 are not configured as a unitarily woven seam, but are, instead, woven or configured as seams having interruptions. The corner areas 23 are bridged over by the respective branches 16, each of which extends inwardly and whose edges 17 and 18 produce the connection between the border edge 13 and the two border edges 15, in that the edge 17 has principally an extent in the length direction of the material web 10 and the edge 18 has an extent principally in a direction transverse to the length direction of the material web. The edges 17, 18 are cut away from one another during the cutting of the individual cutouts 11, so that, in a first finishing step, open edges are produced. The extent of each cutaway woven contour edge (seam 12), which is cut away in the corner areas 23 of each respective one of the cut-outs 11', 11", 11''', is shown in broken lines in FIG. 1a at the respective individual cut-outs 11', 11", 11'''.

In this manner, the cutting line 19 for cutting of the cutout 11 from the material web 10 is shown for each of the respective cutouts 11', 11", 11'''.

An individual cutout 11, which has been cut out of the material web 10, is shown in FIG. 1b as an intermediate or work in process product ready for a further finishing step.

In a further finishing step, there follows for each cut-out 11 which has been separated from the other cut-outs 11, a lifting of the two material web layers 21, 22 from one another, whereby the border edge 13 remaining between the two branches 16, which is configured as a unitarily woven seam by the seam 12, is folded inwardly in the direction toward the shorter parallel border edge 14 and, at the same time, the non-parallel border edges 15 are pushed inwardly.

Figure 5:
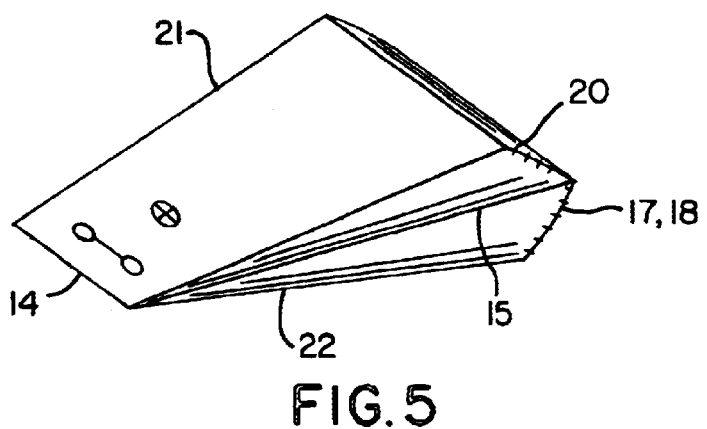
FIG. 5 is a view of a completed three-dimensional airbag corresponding to those views shown in FIGS. 3 and 4.

The sewing process can thus be performed on a flat support such that, initially, the two edges 17 and 18 of the upper material web layer 21 are sewn together with one another and, thereafter, the edges 17 and 18 of the lower material web layer 22 are sewn together with one another so that the collective sewing path shown in FIG. 5 is produced.

Figure 4:
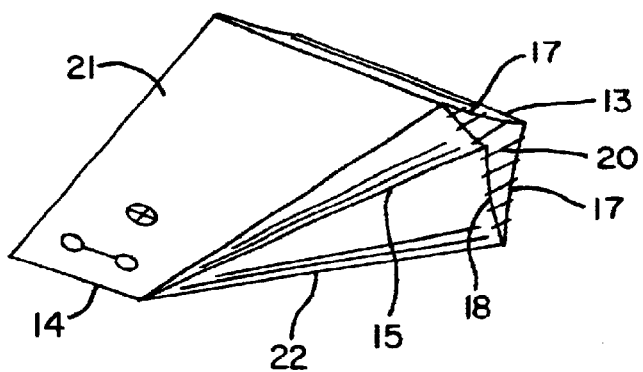
FIG. 4 is a view of the individual cut out shown in FIG. 3 in a further or subsequent finishing step with individual stitches which connect the branch edges being schematically shown.

As can be seen in FIG. 4, in a further finishing step, the edges 17 and 18 of each individual branch of the two material web layers 21, 22 are disposed in opposed relation to one another and are connected to one another by, for example, the darts or knits 20. In this manner, there is produced the three-dimensional wedge-shaped airbag as seen in FIG. 5, which is the completed work product.

What is claimed is:

1. A method for producing for deployment in an air bag module an air bag which in its inflated condition has a three-dimensional form via the fabrication of a two layered material web from which individual air bag cut-outs are continuously cut, the method comprising:

connecting the material web layers to one another along closed contours such that the edges so formed from the connection of the material web layers to one another exhibit a trapezoidal-like shape in that each individual cut-out has a pair of non-parallel edges and one edge which is parallel to and longer than another respective edge and each individual cut-out has a pair of shortened inwardly directed branches each formed in a respective one of the corner areas oppositely disposed to one another and each defined by the respective intersection of one of the two respective border non-parallel edges with the border edge of the longer parallel trapezoid side and each branch has two respective edges disposed at a selected one of a disposition outside of the stitched together area of the individual cut out and along the stitched together area of the individual cut out; and cutting along a cutting line each individual air bag cut-out to be cut out of the material web such that the path of the cutting line of the individual air bag cut-out to be cut out does not correspond, in the area of the corners of the longer trapezoid side, to the contour edge but, instead, to contribute to the formation of the height of the three-dimensional air bag, extends inwardly, whereby, in the subsequent completion of the production of a closed air bag from the individual cut-out, the cutting edges of each branch of each material web layer are connected to one another.

2. A method according to claim 1, wherein the respective extents of the border edges of the longer parallel trapezoid side extending between the two branches of each individual air bag cut-out to be cut out of the material web are folded inwardly upon lifting of the two material web layers away from one another and the edges of each individual branch, which now are oppositely disposed to each other due to the lifting of the material web layers away from one another, are connected to one another.

3. A method according to claim 2, wherein each individual air bag cut-out has the form of an equilateral trapezoid and the respective two branches of each individual air bag cut-out are disposed in the corner areas of the respective longer parallel border edge of the two parallel border edges of the trapezoid, each one of the two edges of each branch being perpendicular or, respectively, parallel, to the parallel border edges.

4. A method according to claim 3, wherein the edges have a curvilinear extent.

5. A method according to claim 3, wherein the individual cut-outs are arranged in the length direction of the material web such that the parallel border edges lie on the parallel sides of the trapezoid-shaped cut-out.

6. A method according to claim 5, wherein the longer parallel border edge of a cut-out is configured with the shorter parallel border edge of a neighboring cut-out so as to form a common seam and the separation of the cut-outs from one another is undertaken along a cutting line extending within the seam.

7. A method according to claim 1, wherein the connection of the material web layers for forming thereby the contour edges is accomplished by the unitary weaving together of the material web layers of a material web such that the material web is in the form of an intermediate or work in process product.

8. A method according to claim 7, wherein all of the border edges of the trapezoid-shaped cut-outs are woven unitarily by a seam and the branches arranged in the corner areas are cut from one another during cutting of the cut-out along the edges of the branches.

9. A method according to claim 7, wherein the border edges of the trapezoid-shaped cut-outs are woven unitarily by a seam extending along a path which bypasses the edges of the two branches.

10. A method according to claim 1, wherein the connection of the material layers to thereby form the contour edges is accomplished through adhesion, welding, or sewing of the two material layers of the material web together.

11. A method according to claim 10, wherein a woven web is used for the production of the two-layer material web.

12. A method according to claim 10, wherein a gas impermeable sheet is used for the production of the two-layer material web.

13. A method according to claim 10, wherein a semi-permeable sheet is used for the production of the two-layer material web.

\* \* \* \* \*